INVENTOR:
C. E. HOTTMAN
BY: *Theodore E. Bieber*
HIS ATTORNEY

United States Patent Office 3,330,356
Patented July 11, 1967

3,330,356
APPARATUS FOR USING A SOURCE OF ENERGY
FROM AN OVERPRESSURED FORMATION
Clarence E. Hottman, Houston, Tex., assignor to Shell Oil
Company, New York, N.Y., a corporation of Delaware
Filed Feb. 25, 1966, Ser. No. 530,222
2 Claims. (Cl. 166—57)

ABSTRACT OF THE DISCLOSURE

An apparatus for completing a well in a closed reservoir that contains aqueous liquid, wherein the reservoir is located below an undercompacted shale formation. The apparatus also includes means for using the energy of the aqueous liquid to separate the aqueous liquid from the hydrocarbons contained in the reservoir liquid.

Figure 1:
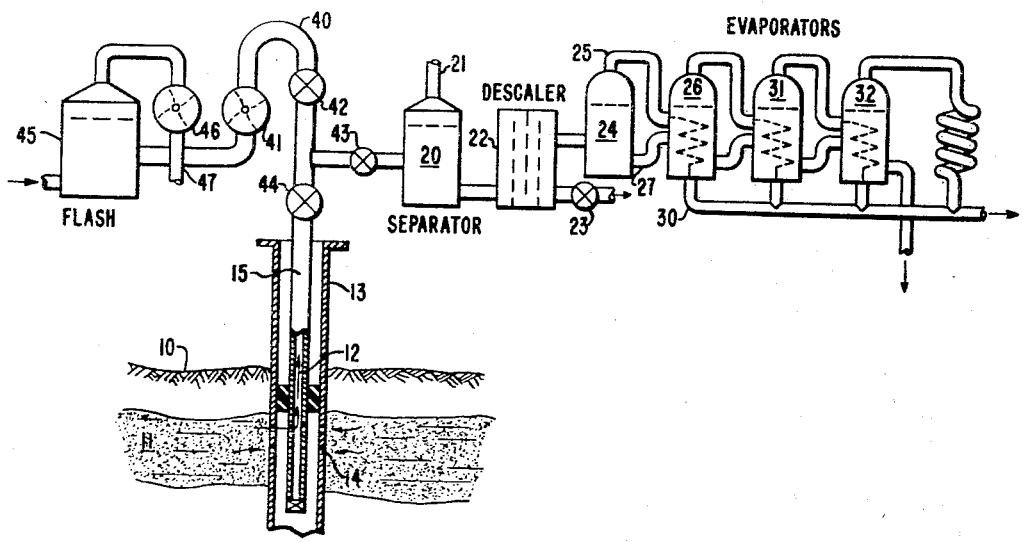

This application is a continuation-in-part of my copending application Ser. No. 256,933, filed Feb. 7, 1963, now Patent 3,258,069.

Energy provided by certain underground reservoir formations has heretofore been utilized to produce electrical energy or to accomplish other useful work. However, such prior uses have been confined to operations within regions in which the energy from the underground sources is available at or near a surface location. Such prior utilizations have been confined to volcanic regions or other regions containing natural hot springs, geysers, or the like.

A principal object of the present invention is to provide an apparatus for completing a well in a closed or isolated reservoir formation containing aqueous liquids capable of releasing useful energy and utilizing the energy.

A further object is to provide an apparatus for completing wells in overpressured water-bearing reservoirs in regions in which it is desirable to produce petroleum and other materials from underground formations by means of steam and hot water drives or fluid-mining procedures, and utilizing the overpressured reservoirs to supply heat and pressure energy to facilitate such production operations.

This invention is directed to an apparatus for completing a well into an underground reservoir containing overpressured aqueous liquid that is entrapped by undercompacted shale and has a pressure and temperature sufficient to yield useful energy. In using the apparatus, the earth formations beneath a selected area of land are investigated to determine the distribution of undercompacted shale formations and reservoir formations. The distribution of temperature is similarly determined if a certain temperature is desirable for the use to be made of energy from the reservoir. Overpressured reservoir formations are identified by comparing the above distributions and identifying reservoir formations located below the top of undercompacted shale formations at depths at which the temperature is sufficient for the use to be made of the reservoir energy. An overpressured aqueous liquid bearing reservoir is identified by determining the nature of the fluid contained in such an overpressured reservoir. A well that encounters an overpressured aqueous liquid bearing reservoir is completed into that reservoir and equipped to produce fluids capable of releasing useful energy at a use location. Such a well is preferably equipped to convey the aqueous liquid from the reservoir to a use location at substantially the temperature and pressure of the reservoir minus the pressure of the hydrostatic column between the reservoir and the use location.

The aqueous liquid produced from an overpressured reservoir may be used to perform various types of work, for example it may be used to generate low pressure steam used to operate turbines or the like. In various situations the most economical use of such water would be as a feed stock for treating equipment such as water distillation plants. Such distillation plants can be designed to yield potable water and by-products such as energy and/or chemicals recovered from the water contained in the reservoir.

Figure 2:
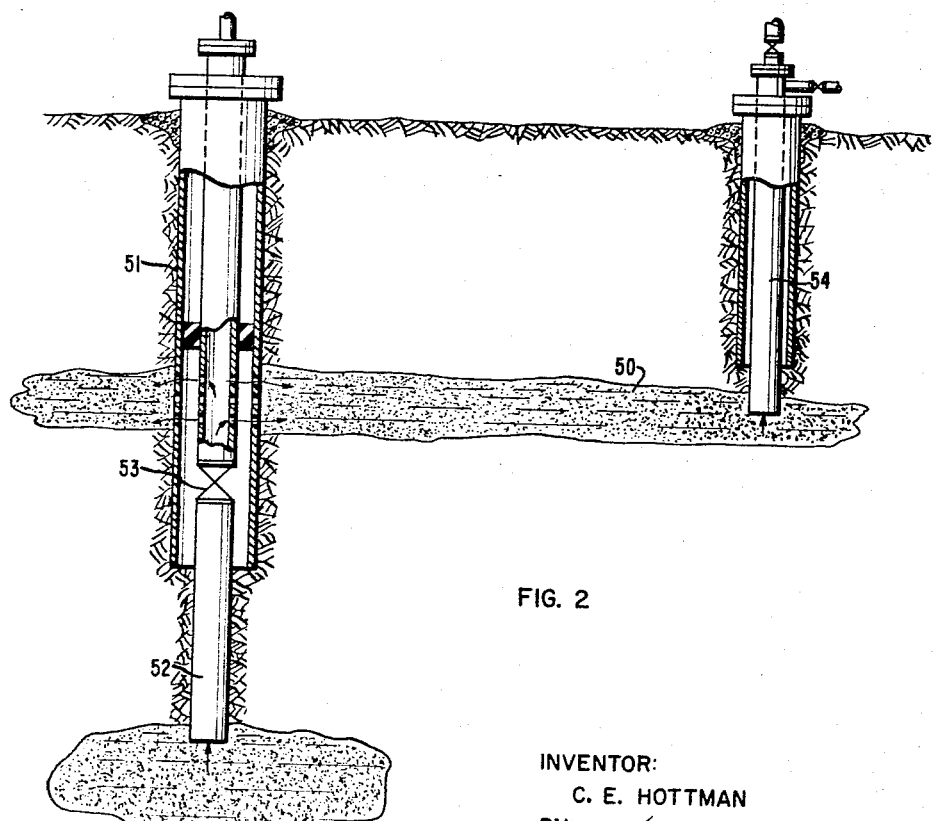

The apparatus of this invention and other advantages of the invention can best be understood from the following detailed description of a preferred embodiment when taken in conjunction with the attached drawings wherein:

FIGURE 1 shows an arrangement for producing water suitable for feed stock for a water distillation system; and, FIGURE 2 shows an arrangement for producing water suitable for use in a water-steam secondary recovery operation.

Undercompacted shale formations occur in many geographical locations, particularly in the Texas-Louisiana Gulf Coast area of the United States that have tertiary shale formations of great thickness. These shale formations are usually deep water marine shales that contain few sand formations and are subject essentially to a uni-axial compaction as a result of the compressive stress of the overburden. In order for this type of shale formation to compact the fluids contained in the formation must be removed. The fluids can only be removed by flowing into sand formations or other permeable avenues of escape. Since the thick shale formations that occur in the Gulf Coast area have very few sand formations to act as avenues of escape, the fluids are removed at a much slower rate than from thinner shale formations sandwiched between sand formations. This inability of the fluid to escape from the shale formation results in the creation of an abnormal fluid pressure within the formation.

The creation of abnormal pressures within a shale formation can be more easily understood by considering the following conception of a shale model. The shale model is formed from perforated metal plates which are separated by springs and water with the complete structure being enclosed within a cylindrical tube. The springs simulate the communication between the clay particles while the plates themselves simulate the clay particles. Upon application of pressure to the uppermost plate the height of the springs between the plates remains unchanged as long as no water escapes from the system. Thus, in the initial stage the applied pressure is supported entirely by the equal and opposite pressure of the water. As the water escapes from the system through the perforations in the plate the uppermost plate will move downward slightly and the springs will carry part of the applied load. As more water escapes the springs will carry an additional load until finally the complete axial load will be borne by the springs and the system will reach a state of equilibrium.

The clay particles forming the shale formation undergo a similar movement to that described above for the model when subjected to a uni-axial compaction due to the overburden. All formations are subject to an axial compaction but more permeable formations reach equilibrium much faster than shale formations. The inability of the shale formations to reach equilibrium results in the occurrence of abnormally high fluid pressured shale formations and abnormally high pressures in the fluids contained in the permeable rocks that are enclosed in such shale.

The existence of undercompacted shale formations beneath various areas of land has heretofore been known. When a well is drilled into a reservoir formation located below the top of an undercompacted shale formation, the reservoir fluid pressure is apt to exceed the pressure provided by the drilling fluid unless the driller is employing a relatively high density mud, and such a well will "kick" or possibly "blow out." Based on drillers' reports, it was heretofore possible to determine the areal extent of the undercompacted shale formations beneath selected areas of land. However, such drilling data do not permit a determination of the distribution of such shale formations since the reservoir formations on which these data are based may be located anywhere from just below the top to well below the undercompacted shale formations.

Methods have recently been developed for measuring properties of the earth formations beneath a selected area of land in a manner indicative of the depth at which the tops of undercompacted shale formations are encountered below particular surface locations within the area. In one type of such measuring procedures, wells disposed within the area are logged to determine the rate of change with depth of a physical property of shale that is affected by the density of the shale, and determinations are made of the depth at which the measured rate undergoes a change due to the encountering of an undercompacted shale formation. Examples of logging procedures suitable for determining the depths at which undercompacted shale formations are encountered include the acoustic-logging procedures described in a copending application of C. E. Hottman entitled "Method for Determining Formation Pressure," Ser. No. 855,653, filed Aug. 10, 1962, now U.S. Patent No. 3,203,866, and the electrical logging procedures described in copending application of C. L. Blackburn et al., entitled "Method for Determining Formation Pressures," filed Sept. 16, 1963, Ser. No. 226,937, now U.S. Patent No. 3,237,094. In practicing the present invention, the localities and the depths at which undercompacted shale formations are encountered are measured to determine the distribution of the undercompacted shale formations. Such determinations of the distributions can be made by indicating the distributions of the formations on maps of the underground formations, for example, by the contouring procedures that are conventionally used in the contouring of the formations located by seismic, gravimetric, and the like exploration techniques.

Techniques for investigating subsurface earth formations to determine the distribution of reservoir formations and temperature are known to those skilled in the art of petroleum exploration, and any means for obtaining such information can be used to obtain the determinations and/or indications utilized in the present process. Such techniques for determining the distribution of reservoir formations include seismic, gravimetric, electromagnetic, stratigraphic correlations, and the like procedures for investigating properties of subsurface formations. In respect to the distribution of the temperature of the subsurface formations, suitable techniques include conventional procedures for logging wells dispersed within the area being investigated by means of maximum-reading, continuous-recording, and the like temperature-measuring equipment.

Overpressured reservoirs located below a selected area of land are identified by comparing the distributions of the undercompacted shale formations, reservoir formations, and temperature. Such identifications can be made by simply overlaying plotted indications of the distributions and indicating the reservoirs that lie below the top of an undercompacted shale formation at depths at which the temperature is suitable for the use to be made of fluid in the reservoir. Alternatively, various digital and other data comparison techniques can be employed.

The properties of overpressured reservoirs are further investigated to identify such reservoirs that contain aqueous liquids. Such investigations can be accomplished by means of conventional well logging, well-log correlating, and the like techniques, such as those involving comparisons of self potential, resistivity, conductivity, nuclear magnetism, and the like data that are affected by the electrolyte concentration of the fluid in a reservoir. Such investigations are preferably accomplished by measuring or sampling fluids contained in reservoirs that have been encountered by a well. In various instances, use can be made of wells that were previously drilled to encounter petroleum deposits and have penetrated into or through such water-bearing reservoir formations and were plugged back or cased off in the portions encountering the water-bearing reservoirs.

The overpressured water-bearing reservoirs that are particularly suitable for use in the present process comprise closed or isolated reservoirs containing aqueous liquids entrapped by undercompacted shale at pressures significantly greater than the pressure of the hydrostatic column above the reservoir and temperatures significantly greater than 212° F. Such reservoirs are often relatively large, hot, and high pressured; e.g., reservoirs having thicknesses as much as 500 feet over extend as much as 100 to 500 square miles, temperatures as much as 365° F. or more, and pressures as much as 10,000 p.s.i.g. or more. The aqueous liquids in overpressured water-bearing reservoirs frequently contain dissolved or entrained materials that can be recovered as by-products of the present method of utilizing the energy contained in those reservoirs. Such materials include dissolved and/or entrained organic materials, particularly petroleum materials, dissolved and/or entrained chemical elements such as sulfur, bromine, iodine, and the like; dissolved and/or entrained inorganic compounds; and the like.

After identifying an overpressured water-bearing reservoir that is encountered by a well, a well is completed into that reservoir and is equipped for conveying the reservoir water to a use location such as a surface location containing equipment designed for utilizing energy provided by the pressure and temperature of the water. Normally this consists of casing the borehole drilled into the reservoir, and then disposing suitable conduits within the casing for producing the reservoir aqueous liquid. The reservoir aqueous liquid is produced substantially at the formation temperature and at the formation pressure minus the hydrostatic head due to the depth of the borehole.

Referring now to FIGURE 1 there is shown one embodiment of this invention in a simplified form for converting saline water to fresh water. The borehole 12 penetrates a shale formation 10 and an overpressured water reservoir 11. The borehole 12 will normally be cased by means of a casing 13 that extends through the shale formation and the water reservoir. The casing 13 is perforated at 14 by any of the various commercial means available. The water from reservoir 11 is then produced through the perforations and the production string 15 that is run into the well.

The water at the surface is fed to a separator 20 where the entrained gas is removed through a vent 21. The water then passes to a descaling unit 22 where the entrained solids are precipitated and removed through a line 23. The recovered solids may be further processed to recover the minerals contained therein. The water then flows into the first stage 24 of a multiple stage flash distillation type process. The pressure is reduced in the multiple stages and a certain percentage of the water vaporized in each stage. As is known the vapor from the first stage 24 is conducted by a conduit 25 to the second stage 26 where it is condensed thus heating the feed supplied to the second stage by conduit 27. The condensed vapor from the first stage is essentially distilled water and is collected by a line 30. The remaining stages operate in the same manner with the vapor from the preceding stage heating the feed for the next stage. Of course, for maximum efficiency a large number of individual stages as shown at 31 and 32 would be used as is well known to those skilled in the art of constructing multiple effect flash type plants.

Also shown in FIGURE 1 is a means for generating electricity using either the pressure and/or temperature of the water produced could be removed through a conduit 40 and the pressure of the water used to operate a turbine 41. The quantity of water used to operate the turbine 41 can be controlled by a valve 42 with valves 43 and 44 being used to control the quantity of water supplied to the evaporator process and produced by the well, respectively. After passing through the turbine 41 the water passes into an evaporator 45 where a portion is flashed into steam that is used to drive a second turbine 46. The exhaust from the turbine 46 is condensed and the condensate conveyed by a conduit 47 to join with the condensate from the evaporator process.

The following are examples of sources of energy found by the method of this invention:

*Example I*

A selected area of land in Texas was investigated to determine the distribution of undercompacted shale formations, reservoir formations, and temperature. The earth formations under that area were found to include an underground shale formation, the top of which is located at a depth of 9600 feet at a point at which the shale extends above a reservoir formation located at 13,000 feet in a zone at which the temperature is 365° F. The self potential and resistivity logs of a well encountering that reservoir indicated it to be a water-bearing reservoir. The well was completed into this overpressured water-bearing reservoir. This reservoir contains water entrapped by undercompacted shale and comprises a layer of sand having a thickness of about 200 feet and an extent from about 10 to 50 square miles. The water in the reservoir has a pressure of 10,400 p.s.i.g.

Equipping a well completed into this reservoir to transport reservoir fluids to a surface location for supplying superheated water as a feedstock to an evaporation apparatus of the type shown in FIGURE 1 provides a means for converting the reservoir water to fresh water. The reservoir water which is so supplied has a pressure of 4,850 p.s.i.g., a salinity of 37,000 p.p.m. chloride ion concentration, an available flow rate of 1,300 barrels per day through an ⅝₄-inch choke, and an estimated tubing flow rate of 10,000 barrels per day.

*Example II*

A selected area of land under the Gulf of Mexico was investigated to determine the distribution of undercompacted shale formations, reservoir formations, and temperature. The earth formations under that area were found to include an underground shale formation, the top of which is located at a depth of 9,150 feet at a point at which the shale extends above a reservoir formation located at 11,000 feet in a zone at which the temperature is 285° F. The self potential and resistivity logs of a well encountering that reservoir indicated it to be a water-bearing reservoir. The well was formation tested in this overpressured water-bearing reservoir interval. This interval contains water entrapped by undercompacted shale and comprises a net sand thickness of about 500 feet and an extent from about 100 to 500 square miles. The water in this interval has a pressure of 8,250 p.s.i.g.

Equipping a well completed into this reservoir interval to transport reservoir fluids to a surface location for supplying superheated water as a feedstock to an evaporation apparatus of the type shown in FIGURE 1 provides a means for converting the reservoir water to fresh water. The reservoir water which is so supplied has a pressure of 2,750 p.s.i.g., an estimated salinity of 35,000 p.p.m. chloride ion concentration, and an estimated available flow rate of 100,000 barrels per day.

Referring to FIGURE 2 there is shown an underground oil-bearing reservoir 50 conveniently located relative to the area of land mentioned in Example I. The reservoir contains about 50 percent of a pore volume of residual oil at a pressure of about 2,000 p.s.i.g. and may be produced by utilizing energy provided by the overpressured water-bearing reservoir described in Example I. A well 51 is completed into the overpressured water-bearing reservoir and equipped to transport superheated water from the reservoir into the injection tubing string 52 into the oil-bearing reservoir. The pressure of the superheated water is reduced by means of a flow restriction 53 in the injection tubing string so that some of the water evaporates. The flow restriction 53 may be provided with surface operated controls in order that the quantity of water and steam injected may be varied. The oil displaced by the injection of water and steam is produced from a production well 54 completed into the oil-bearing reservoir.

Where such an oil-bearing reservoir has the permeability and/or a pressure such that it is unfeasible or undesirable to reduce the pressure of the hot water from an overpressured water-bearing reservoir, the energy provided by the overpressured reservoir can be used advantageously to supply all or part of the fluid-injecting and formation-heating energy utilized in such a hot water drive. In general, the energy provided by such overpressured reservoirs can be utilized in displacing fluid from underground earth formations by injecting a fluid that contains fluid from the overpressured reservoir into the underground earth formation and transmitting energy from the overpressured reservoir fluid to the fluid that is injected into the underground earth formation.

From the above description it can be seen that the method of this invention comprises the steps of locating and completing a well into an overpressured aqueous liquid bearing reservoir located below the top of an undercompacted shale formation in a zone in which the temperature is relatively high and preferably above 212° F; and producing the water from the reservoir to utilize energy from the reservoir. This method is further characterized as being particularly adaptable to providing fresh water obtained from underground reservoirs of salt water through the use of multiple effect processes in areas where sufficient natural supplies of fresh water do not exist. This is particularly true since a known location of undercompacted shale formations is the lower Louisiana-Texas Gulf Coast area of the United States. This area also coincides with an area that is finding it difficult to supply the fresh water demands of the area. Thus, this invention would supply a low cost source of feed for a multiple effect process and reduce the net cost of the fresh water produced by the process so that it would compare favorable with presently available commercial supplies of fresh water.

While the invention is particularly adapted to the production of fresh water in the lower Gulf Coast area of the United States it obviously could be used to produce a source of energy for any desired purpose. The energy is derived from the elevated temperature and elevated pressure of the water produced by following the method of this invention. This energy can be used to generate electricity by conventional processes.

The method of this invention may be used to investigate previously drilled boreholes that were abandoned for failure to produce commercial quantities of petroleum products. By using previously drilled boreholes the net cost of the water produced would be considerably decreased. The previously drilled boreholes can be investigated by the method of this invention and the wells can be recompleted into overpressured water reservoirs. The water can then be produced and used as a source of potential energy as described above.

This invention provides a means of economically recovering hydrocarbons from a source that was heretofore not considered as a possible source of reserves of recoverable petroleum. It provides a means of recovering the petroleum dissolved in aqueous liquids that are entrapped by undercompacted shales. Large quantities of petroleum can be recovered from this type of deposit. For example, the aqueous liquids contained in reservoirs such as the one described in Example I have been found to contain 16 cubic feet light hydrocarbon per barrel of water. A recovery of, for example, 75 percent of the normally gaseous petroleum contained in the aqueous liquid produced from such a well would produce 12 cubic feet gas per barrel of water produced. At the high water-production rates, e.g., 100,000 barrels per day, that may be feasible from such overpressured reservoirs, such as gas-recovery system would produce over a million cubic feet per day of gas.

The size and temperature of a reservoir that is large enough and hot enough to provide an economical source of fluid and energy for at least several years should, in general, exceed the following minimums. The size should be substantially equivalent to a reservoir containing a producing interval of at least about 500 mile-feet (for instance, a reservoir 100 feet thick and 5 miles in diameter), and the reservoir temperature should at least exceed the ambient temperature at the use location. In such reservoirs the amount of energy provided by the temperature and pressure, in conjunction with the volume of aqueous liquid which can be produced from the reservoir, may provide the most economical way in which an important item (such as potable water, energy, gaseous hydrocarbons, or hot pressurized aqueous liquid and gas) can be produced in a given arid region or offshore location.

In drilling a well having a borehole that extends below a use location, through an undercompacted shale formation and into fluid communication with a reservoir containing aqueous liquid entrapped by undercompacted shale, numerous drilling and logging techniques can be utilized. For example, the depth at which a borehole encounters an undercompacted shale formation can be determined by (1) drilling with a lightweight drilling fluid, monitoring its responses to the pressure of the fluids in the formations near the bottom of the borehole, and determining the depth at which overpressured formations are encountered from the responses of the drilling fluid, i.e., by employing the lightweight mud drilling techniques of copending patent application Ser. No. 357,485, filed Apr. 6, 1964; (2) continuously or intermittently measuring a density-responsive physical property of the shales that are encountered as the borehole is deepened and programming a computer to determine the trend with depth in normally pressured shales and to determine the depth at which a change occurs in the trend, as described in copending patent application Ser. No. 522,215, filed Jan. 21, 1966; and (3) making such trend and depth determinations in one or more boreholes that encounter similar sequences of formations and then extending another borehole beyond the depth at which the shale formations are undercompacted.

I claim as my invention:
1. A well installation which comprises:
 (a) a use location containing means for utilizing energy provided by the temperature and pressure of an aqueous liquid to produce potable water from the water contained in the aqueous liquid;
 (a) a well having a borehole that extends below said use location, through an undercompacted shale formation, and into fluid communication with a closed reservoir containing aqueous liquid entrapped by undercompacted shale at a temperature and pressure providing an amount of energy equivalent to significantly more energy than that of the ambient fluid at said use location; and
 (c) at least one conduit and means for controlling the flow of fluid through the conduit, said conduit being connected between said use location and said reservoir for conveying said aqueous liquid to the use location at a temperature and pressure providing an amount of energy significantly greater than the energy of the ambient fluid at the use location.
2. The well installation of claim 1 wherein said use location contains means for utilizing the energy of aqueous liquid from said reservoir in producing material from an underground formation having no natural fluid communication with said reservoir.

References Cited
UNITED STATES PATENTS

| | | | |
|---|---|---|---|
| 2,856,000 | 10/1958 | Barron | 166—9 |
| 2,875,833 | 3/1959 | Martin | 166—9 |
| 2,875,836 | 3/1959 | Stiff et al. | 166—9 |

OTHER REFERENCES

Dickinson: "Geologic Aspects of Abnormal Reservoir Pressures in Gulf Coast Louisiana," Bulletin, American Association of Petroleum Geologists, vol. 37, No. 2 2/1953), pp. 410–424 relied on (TN 860 A 51).

Uren: Petroleum Production Engineering Exploitation, 2d edition, McGraw-Hill Book Co., Inc., 1939, pp. 472–484.

CHARLES E. O'CONNELL, *Primary Examiner.*

STEPHEN J. NOVOSAD, *Examiner.*